United States Patent [19]

Schaffer

[11] 3,922,650

[45] Nov. 25, 1975

[54] SWITCHED CAPACITOR NON-VOLATILE MNOS RANDOM ACCESS MEMORY CELL

[75] Inventor: Albert M. Schaffer, Kettering, Ohio

[73] Assignee: NCR Corporation, Dayton, Ohio

[22] Filed: Nov. 11, 1974

[21] Appl. No.: 522,663

[52] U.S. Cl. .......... 340/173 CA; 307/238; 307/246; 340/173 R

[51] Int. Cl.[2] .................... G11C 11/24; G11C 11/40

[58] Field of Search.... 340/173 R, 173 CA, 173 PP; 307/238, 246, 304

[56] References Cited

UNITED STATES PATENTS

| | | | |
|---|---|---|---|
| 3,691,535 | 9/1972 | Williams | 340/173 PP |
| 3,774,177 | 11/1973 | Schaffer | 340/173 R |

*Primary Examiner*—Stuart N. Hecker
*Attorney, Agent, or Firm*—J. T. Cavender; Lawrence P. Benjamin

[57] ABSTRACT

A random access memory cell comprises three capacitance means and three field effect transistors. One capacitance means is a pseudo-transistor which is embodied in the cell to principally provide means for refreshing the cell. One transistor has an alterable threshold and is embodied in the cell to store information at "power down".

9 Claims, 3 Drawing Figures

SWITCHED CAPACITOR NON-VOLATILE MNOS RANDOM ACCESS MEMORY CELL

BACKGROUND OF THE INVENTION

1. Field of the Invention:

This invention relates to random access memory cells and in particular to a non-volatile random access memory cell.

2. Description of the Prior Art:

Heretofore, volatile random access memory cells have proven to be disadvantageous in several aspects of their use. At power down, information stored in the cell is lost and upon power up must be restored in the cell before normal operations embodying use of the cell can begin. In addition, during normal operation of the cell, periodic refreshing of the cell is required to keep the information stored in the cell available for instant recall at any time. Fatigue of the prior art cell which occurs from the occurrence of write-erase cycles creates a reliability problem and decreases the life of the memory cell necessitating periodic replacement of the same. When a plurality of cells comprise an array in a memory matrix fabricated in a semiconductor chip in the form of an integrated circuit, substrate isolation is required between mutually adjacent cells for a completely decoded array. Many prior art cells also experience stored information data reversal upon power up occurrence such, for example, as a stored logic 1 being inverted to stored logic 0 upon power up.

Therefore, it is an object of this invention to provide a random access memory (RAM) cell which overcomes the deficiencies of the prior art memory cells.

Another object of this invention is to provide a non-volatile random access memory cell.

A further object of this invention is to provide an array of non-volatile random access memory cells in an integrated circuit configuration wherein a completely decoded array is provided without substrate isolation between each mutually adjacent pair of cells.

A still further object of this invention is to provide an array of random access memory cells wherein all cells in the system are completely refreshed by a single pulse on a common refresh bus connected thereto.

Yet another object is to provide an array of random access memory cells wherein no isolation diffusion is required for a completely decoded array.

Other objects of this invention will, in part, be obvious and will, in part, appear hereinafter.

BRIEF DESCRIPTION OF THE INVENTION:

In accordance with the teachings of this invention there is provided a non-volatile random access memory cell wherein the circuit diagram shows three field effect transistors and three capacitors. One capacitor is provided as means to refresh the cell and one transistor is provided to store information, for the cell, in the event of a power failure or a power down.

Figure 1:
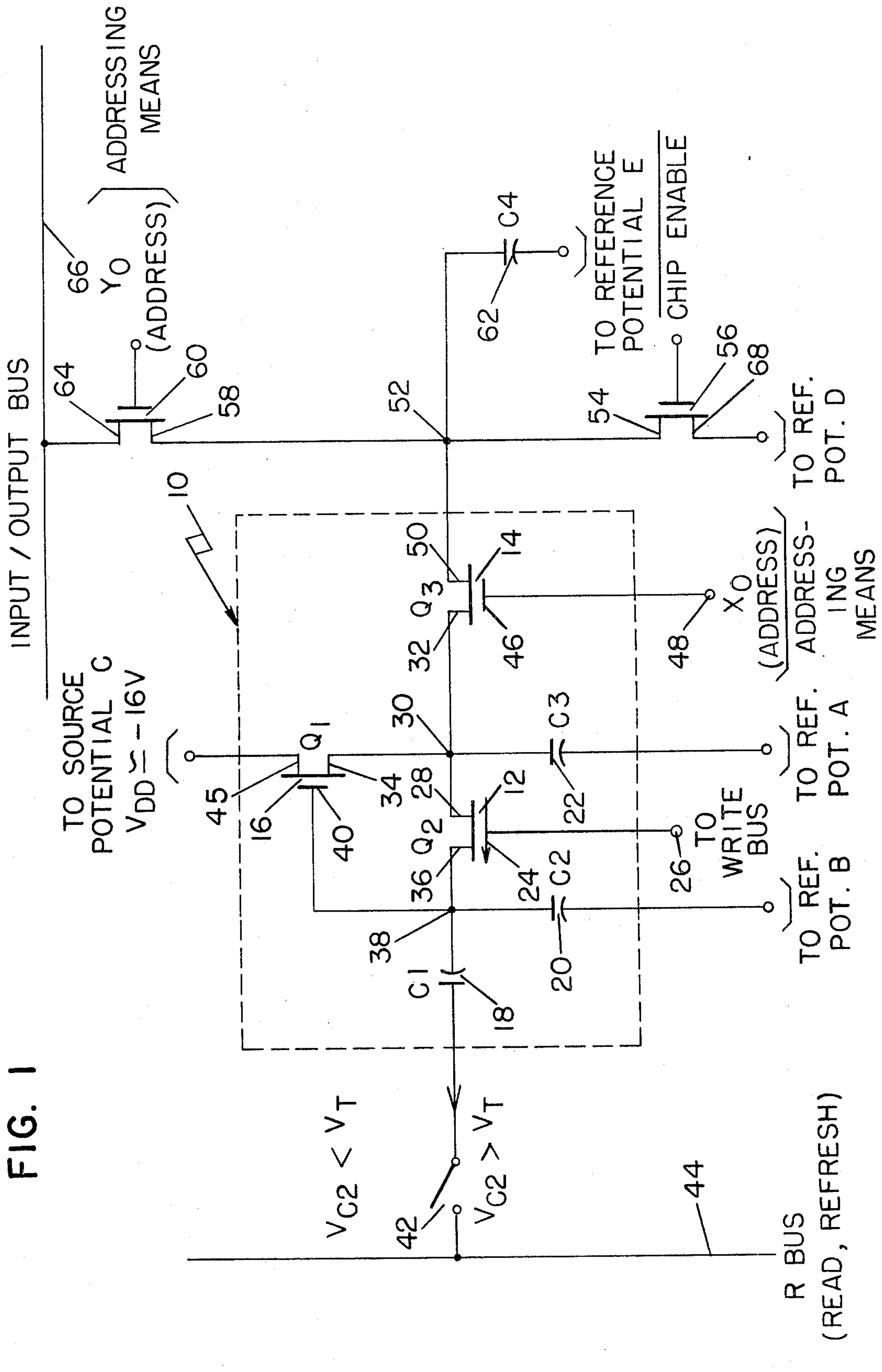
FIG. 1 is a circuit diagram of my novel random access memory cell.

DESCRIPTION OF THE PREFERRED EMBODIMENT:

Referring now to FIG. 1, there is shown the circuit diagram of a random access memory cell 10 made in accordance with the teachings of this invention. Cell 10 has three field effect transistors 12, 14 and 16, one of which (transistor 12) is an alterable threshold transistor and three capacitance devices 18, 20 and 22. The transistors may be of p-channel or n-channel configuration. To more particularly describe the invention and for no other reason, the transistors 12, 14 and 16 will be described as being of p-channel configuration.

Transistor 12 may, for example, be an insulated gate field effect transistor (IGFET) having a gate region of two layers of dielectric material and an interface formed by the abutting surfaces of the dielectric layers. The interface is capable of storing information in the form of an electrical charge in the interface. One suitable IGFET device that may be used is a metal-nitride-oxide-semiconductor (MNOS) transistor or another form would be a MAOS, metal-alumina-oxide-semiconductor. The transistors 14 and 16 may be of the type of a metal-oxide-semiconductor (MOS) transistor.

Gate electrode 24 of transistor 12 is connected, via terminal 26, to means (not shown) for writing or storage of information in the gate region of transistor 12. Drain region 28 of transistor 12 is connected via common terminal 30 to drain region 32 of transistor 14 and source region 34 of transistor 16. The interconnected regions 28, 32 and 34 are simultaneously connected to capacitance means 22, which is series connected between terminal 30 and a source of reference potential A. Source region 36, of transistor 12, is connected via common terminal 38 to gate electrode 40 of transistor 16. The region 36 and the gate electrode 40 are connected together at terminal 38 and to capacitance means 18 and series connected switching means 42 between terminal 38 and read, refresh bus 44. To complete the circuit connections for transistor 16, drain region 45 is connected to a source potential C.

Gate electrode 46 of the transistor 14 is connected via terminal 48 to means (not shown) for the addressing of cell 10 via transistor 14. Source region 50 of transistor 14 is connected, via common terminal 52, to drain region 54 of transistor 56 and to source region 58 of transistor 60. Simultaneously, regions 50, 54 and 58 are connected to capacitance means 62 the connection of which is series connected between common terminal 52 and reference potential E. Drain region 64 of transistor 60 is connected to the input/output bus 66 and the connection of source region 68 of the transistor 56 to reference potential D completes the circuit. It should now be obvious, to those skilled in the art that transistors 56 and 60 may also be of an MOS configuration.

The arrangement of the components of the cell 10 and the various electrical interconnections therebetween and electrical connections to and from the cell 10 is particularly suited for adaptation in the field of microelectronics. A plurality of the cells 10 may be arranged in an array of rows and columns as an integrated circuit fabricated in a semiconductor chip. A novel feature of the array is that no isolation diffusion is required between cells for a completely decoded array.

To understand the operation of my novel cell it should be understood that capacitance means 18 is a "switched" capacitor. The design of an array embodying the cell 10 of this invention includes the switched capacitor which forms, in part, a pseudo-transistor, typically of an MOS configuration, having a gate and a drain region but no source region. In addition the pseudo-transistor provides the switching functions of switching means 42 and read, refresh bus 44.

The switched capacitor 18, is primarily employed to refresh the cell 10, but has a second function as well which is in the read mode of cell 10. Capacitance means 18 is either connected to or disconnected from the read, refresh bus 44 as capacitance means 20 is respectively charged or discharged. In normal operation, the semiconductor substrate, in which cell 10 is fabricated, is reverse biased thereby causing an inversion layer under the gate area of the pseudo-transistor which is defined by capacitance means 18. The inversion layer is connected to, or disconnected from read, refresh bus 44, at a point on the perimeter of capacitance means 18 fabricated in the substrate.

As the pseudo-transistor is typically of a conventional MOS transistor configuration, one may assume a threshold voltage $V_{TO}$ of 1.5 volts. The source (inversion layer)-to-substrate reverse bias $V_{SS}$ may, for example, be about +9 volts. Capacitance means 20 and 22 are parasitic capacitors of transistor 12 formed by the capacitance between the p-n junctions of the respective source and drain regions 36 and 28, and ground potential. In such an instance, the substrate is at ground or some other source of reference potential in which case potential A = potential B = potential D = potential E. Potential C, in this example, may typically be about −16 volts. With $V_{SS}$ of +9 volts and capacitance means 20 storing information equal to logic 1 therein, (about −8 volts with respect to ground) capacitor means 18 is connected to the read, refresh bus 44. The −8 volts is enough to switch capacitance means 18 since, by MOS theory, the switching threshold $V_T$ of the pseudo-transistor is 2.7 volts. When the capacitance means stores information that is represented by a charge of less than 2.7 volts, capacitance means 18 is not connected to read, refresh bus 44. It is important to note that the capacitance of C1 (means 18) is always much greater, in the order of five to twenty times greater, than the capacitance of C2 and C3 (means 20 and 22).

Figure 2:
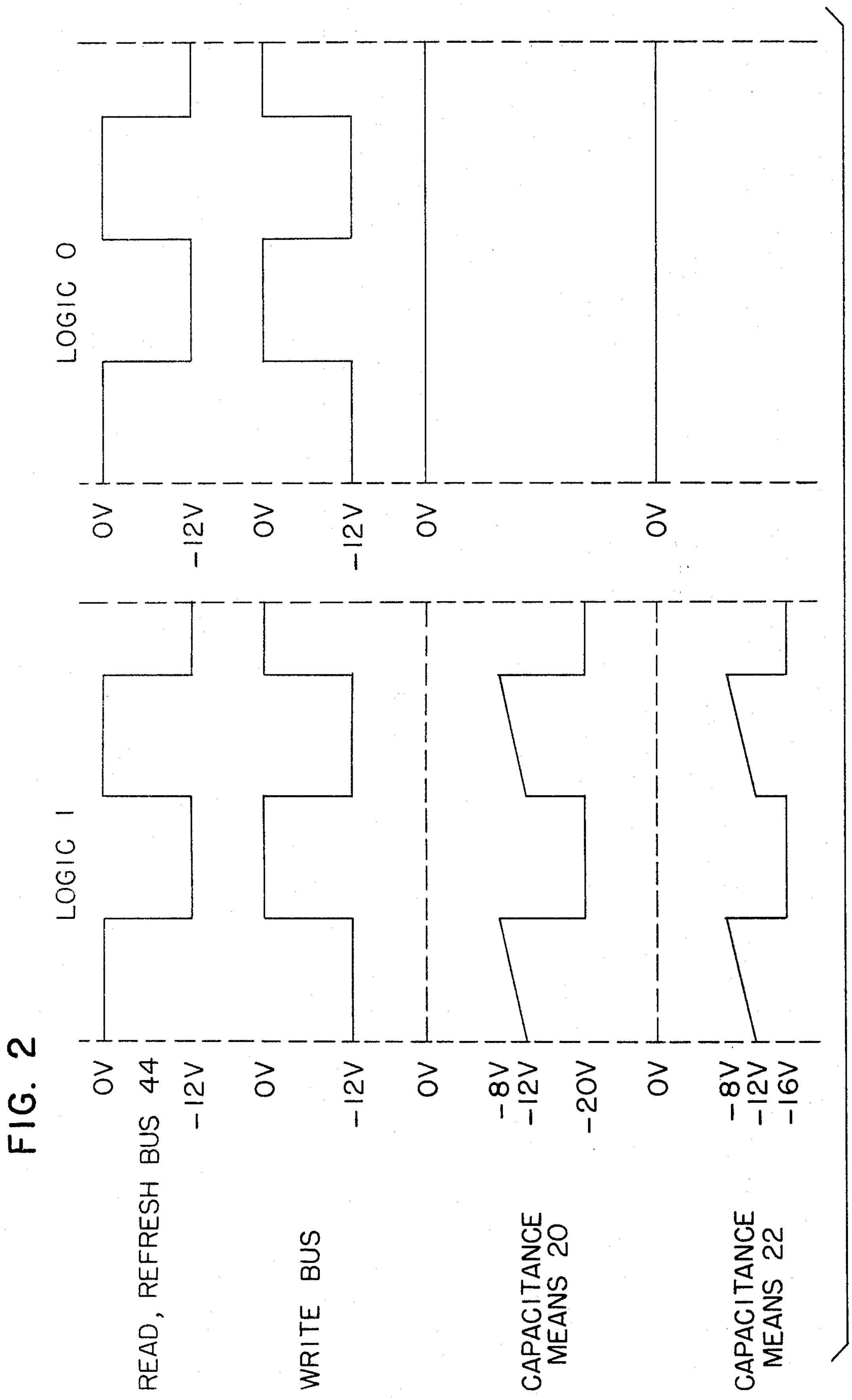
FIG. 2 is a timing diagram useful in the explanation of the circuit diagram of FIG. 1.

Referring now to FIG. 2, together with FIG. 1, the operation of cell 10 for the refresh, read, write, store and restore modes will be described in detail. As indicated in the timing diagram of FIG. 2, the phase relationship of the signals appearing on bus 44 is in opposition to those appearing on write bus 26. Two storage possibilities exist for cell 10 during the refresh mode. Cell 10 may contain a logic 1 in which case C2 is charged to typically −8 volts or cell 10 may contain a logic 0, in which event, C2 (capacitance means 20) is in essence discharged, that is charged to less than −2.7 volts.

In the instance where cell 10 has a logic 1 stored in C2 and write bus (not shown) has turned on transistor 12, via terminal 26, C2 is connected to C3 via source and drain regions 36 and 28 respectively of transistor 12. C2 and C3 are both charged to −8 volts. It is to be noted that when bus 44 is at ground potential, C1 (capacitance means 18) is also charged to −8 volts. As stated previously C1 has a much greater magnitude of capacitance than C2. Therefore, when bus 44 is pulsed, following turn off of write bus 26, C1 having such a relatively high capacitance will not change its voltage state and the entire voltage excursion on bus 44 will appear on C2 in addition to any initial −8 volts charge. If the total excursion appearing on bus 44 is 12 volts, C2 may be charged to as great as −20 volts [−8 volts + (−12 volts)] during the refresh or read mode of a logic 1. The charge stored in C2 turns transistor 16 "on" via gate electrode 40, and C3 is then charged to the level of the voltage $V_{DD}$ which is applied to drain region 45 of transistor 16. When the signal on bus 44 returns to ground potential, C2 and C3, now connected in parallel and are both charged to about −12 volts with respect to ground. However, when the write bus, connected to terminal 26, turns transistor 12 on, C1 and C2 become charged to the same level as the charge appearing on C3, thus refreshing the originally stored information in C2 to the original logic 1. This transfer of incremental charge must take place periodically to replace charge lost through normal leakage mechanisms.

Refreshing cell 10 when a logic 0 is stored in C2 is quite simple. In the situation of a stored logic 0, the voltage stored in C1, C2 and C3 (capacitance means 18, 20 and 22) are all equal to each other and that voltage is approximately zero (0). When $V_{C18} = V_{C20} = V_{C22} = 0$, C1 is disconnected from bus 44. The voltage excursion appearing on bus 44, (a total of 12 volts for the entire sweep) is not transferred through C1 to C2, transistor 16 therefore remains off, and C3 does not become charged to the value of $V_{DD}$. When the signal appearing on bus 44 returns to ground potential from the excursion to −12V, C3 has no stored charge therein to be "dumped" into C1 and C2 and all capacitance means of cell 10 remain discharged.

In the read mode, the column capacitance means 62 (C4) is first discharged. Bus 44 is pulsed on and transistor 16 charges capacitance C4 through transistor 14 if a logic 1 is stored in cell 10. This is accomplished by first turning transistor 14 on by address terminal 48. If a logic 0 is stored in cell 10 to be read, C4 will remain discharged when being read. Thus, the data is read directly out into C4 and is outputted via Y column select transistor 60 and input/output bus 66.

In the write mode, input data on the input/output bus 66 is transferred to the column bus capacitance C4 via the Y decode transistor 60. Transistor 14 is turned on by addressing means (not shown) which enables enabling gate electrode 46 of transistor 14. Transistor 12 is turned on by write means (not shown) enabling gate electrode 24 of transistor 12. A direct path is thus established to C1 and C2 to enable one to easily make changes in stored information as required.

The store mode is exercised only at power down. That is, anytime power is lost, for any reason, to cell 10. At power down, information is transferred to transistor 12 for storage at the interface of the two layers of dielectric material comprising the gate region thereof. The information is transferred non-volatilely to the gate structure of transistor 12 from the volatile charge state of C1 and C2.

At power down the chip enable means (not shown) connected to transistor 56 is disabled upon completion of the memory cycle then in execution. A highly negative pulse, of the order of about −24 volts, is applied to write bus via terminal 26 connected to gate electrode 24 of the transistor 12, to store information simultaneously in all cells 10 in the system. In those memory cells 10 storing information as a logic 1, the transistor 12 will not experience a threshold shift from −3 volts to typically −12 volts. The non-occurrence of the threshold shift results due to the fact that C1, C2 and C3 are charged to about −8 volts or more, thereby causing channel shielding to occur in that amount. Those memory cells 10 storing information as a logic 0 have capacitances C1, C2 and C3 which are discharged, that is charged to approximately zero (0) volts. Therefore, transistor 12 is turned ON in response to the write pulse and the channel between 36 and 28 which is at 0 volts sees the full write voltage. Thus, the threshold voltage of transistors 12 in each of the cells 10 storing a logic 0 is changed to typically −12 volts.

For the restore mode, before normal read/write operation can be initiated at power up, it is first necessary to regenerate each cell 10. This initial operation requires reinstating a charge in each of the capacitances C1, C2 and C3, followed by a subsequent erase operation to shift the thresholds of transistor 12 back to the normal −3 volt state. Cell 10 is addressed via transistors 14 and 60, and the capacitance C4 of the column lead is charged to typically −12 volts. The write bus connected to gate electrode 24 of transistor 12 is set at an intermediate voltage between −3 volts and −12 volts, such, for example, as −7 volts. If the transistor 12 already has a threshold voltage of −12 volts, it will not turn on thereby preventing transfer of information from C4 to C1 and C2. It follows, therefore, that a logic 0 stored in such a cell 10 will reopen as a stored logic 0 on power up.

A cell 10 storing a logic 1 as information will not experience a threshold shift from −3 volts to −12 volts on power down. Therefore during this operation of the restore mode, transistor 12 will turn on and the charge stored in capacitance C4 is transferred to capacitances C1 and C2.

Upon completion of regenerating all the charges in the cells 10 (several refresh cycles may be required), a high positive voltage such, for example, as +30 volts is applied to gate electrode 24 of transistor 12 via the write means (not shown) connected thereto to erase the threshold of transistor 12, where necessary, and thus to the former −3 volt condition. Normal random access memory operation is now possible.

Figure 3:
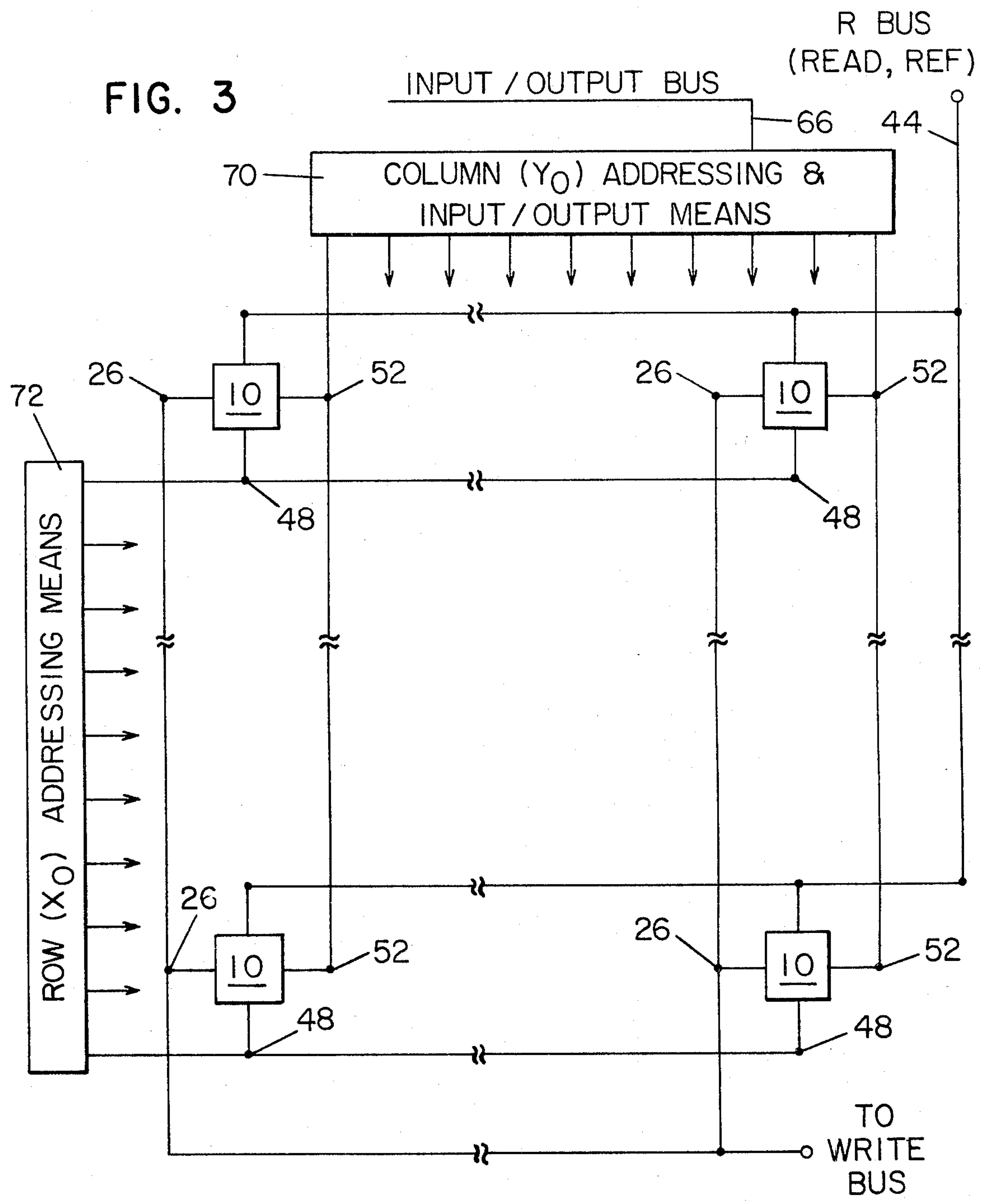
FIG. 3 is an array of my novel random access memory cells.

As will now become obvious to those skilled in the art, cell 10 of FIG. 1 may be used to form a random access, nonvolatile array. Referring now to FIG. 3 there is shown a representative array wherein random access memory cells made in accordance with the teachings of this invention, are arranged in rows and columns. Write bus, which is connected to all cells 10, is shown connected to terminal 26 as in FIG. 1 for writing or storage of information in the gate regions of all transistors 12 of cells 10. Similarly, the read-refresh bus 44 is shown connected as the input, (capacitor 18 of FIG. 1) of all cells 10 of the array.

Input/output bus 66 is shown connected to the "Column ($Y_0$) addressing means" 70 which has a plurality of outputs therefrom. Each one of these outputs is connected to the respective terminals 52 appearing in a given column. Similarly "Row ($R_0$) addressing means" 72 applies each of its plurality of outputs to respective terminals 48 in any given row of cells 10.

I claim:

1. An MOS random-access integrated circuit memory cell which utilizes at least separate read-refresh, input-output, write, and addressing lines comprising:

a two terminal switched capacitor adapted for storing an electrical charge, having one of its terminals coupled to the read-refresh line;

a first alterable threshold MOS device having a gate coupled to the write line and at least two other electrodes, one of the other electrodes coupled to the other terminal of the switched capacitor, the other electrode coupled to a common junction;

a first storage capacitor coupled between a first source of reference potential and the common junction;

a second MOS device having a gate coupled to the other terminal of the switched capacitor and at least two other electrodes, one of the other electrodes coupled to the common junction, the other electrode coupled to a source of operating potential;

a third MOS device having a gate coupled to the addressing line and at least two other electrodes, one of the other electrodes coupled to the common junction, the other electrode coupled to the input-output line; and a second storage capacitor coupled between a second source of reference potential and the other terminal of the switched capacitor to allow the switched capacitor to couple the read-refresh line to the first MOS device during intervals the second capacitor is charged above a given value and to allow the switched capacitor to disconnect the read-refresh line from the first MOS device during intervals the second capacitor is charged below the given value.

2. The cell of claim 1 wherein the first MOS device stores information therein when operating potential is removed.

3. The cell of claim 2 wherein the first MOS device is a metal-nitride-oxide-semiconductor.

4. The cell of claim 2 wherein the first and second storage capacitors are the parasitic capacitances between the cell and a substrate supporting the cell.

5. An MOS random-access integrated circuit memory cell which utilizes at least separate read-refresh, input-output, write, and addressing lines comprising:

a body of semiconductor material supported on a substrate;

a gate and a drain region in the semiconductor material defining a two terminal switched capacitor adapted for storing an electrical charge, having the drain region coupled to the read-refresh line;

a first alterable threshold MOS device having a gate, a source region and a drain region, wherein the gate is coupled to the write line, the source region is coupled to the gate of the switched capacitor and the drain region is coupled to a common junction;

a first storage capacitor coupled between a first source of reference potential and the common junction;

a second MOS device having a gate, a source region and a drain region wherein the gate is coupled to the gate of the switched capacitor, the source region is coupled to the common junction and the drain region is coupled to a source of operating potential;

a third MOS device having a gate, a source region and a drain region, wherein the gate is coupled to the addressing line, the drain region is coupled to the common junction and the source region is coupled to the input-output line; and a second storage capacitor coupled between a second source of reference potential and the gate of the switched capacitor to allow the switched capacitor to couple the read-refresh line to the first MOS device during intervals the second capacitor is charged above a given value and to allow the switched capacitor to disconnect the read-refresh line from the first MOS device during intervals the second capacitor is charged below the given value.

6. An array of MOS random-access integrated circuit memory cells arranged in columns and rows, the array utilizing at least separate read-refresh, input-output, write, and addressing lines comprising:

a two terminal switched capacitor associated with each cell capacitor adapted for storing an electrical charge and having one of its terminals coupled to the read-refresh line;

a first alterable threshold MOS device associated with each cell, each such device having a gate coupled to the write line and at least two other electrodes, one of the other electrodes coupled to the other terminal of the switched capacitor of the cell, the other electrode coupled to a common junction of the cell;

a first storage capacitor coupled between a first source of reference potential and the common junction;

a second MOS device associated with each cell, such device having a gate coupled to the other terminal of the switched capacitor and at least two other electrodes, one of the other electrodes coupled to the common junction, the other electrode coupled to a source of operating potential;

a third MOS device associated with each cell, each such device having a gate and at least two other electrodes, the gate of each such third MOS device in a cell in a given row coupled to respective ones of a plurality of addressing lines, one of the other electrodes coupled to the common junction, the other electrode of each such third MOS device in a cell in a given column coupled to respective ones of a plurality of input-output lines; and a second storage capacitor associated with each cell and coupled between a second source of reference potential and the other terminal of the switched capacitor to allow the switched capacitor to couple the read-refresh line to each of the first MOS devices of each cell during intervals the second capacitor is charged above a given value and to allow the switched capacitor to disconnect the read-refresh line from the first MOS device during intervals the second capacitor is charged below the given value.

7. The cell of claim 6 wherein the first MOS device of each cell of the array stores information therein when operating potential is removed.

8. The cell of claim 7 wherein the first MOS device of each cell of the array is a metal-nitride-oxide-semi-conductor.

9. The cell of claim 7 wherein the first and second storage capacitors of each cell of the array are the parasitic capacitances between the cell and a substrate supporting the cell.

* * * * *